United States Patent [19]

Rippie

[11] 4,247,298

[45] Jan. 27, 1981

[54] DRUG DISSOLUTION WITH A CASCADE BARRIER BED

[75] Inventor: Edward G. Rippie, North Oaks, Minn.

[73] Assignee: The Regents of the University of Minnesota, Minneapolis, Minn.

[21] Appl. No.: 24,963

[22] Filed: Mar. 29, 1979

[51] Int. Cl.³ ...................... G01N 31/00; B01L 11/00; G01N 15/00

[52] U.S. Cl. .................................... 23/230 R; 422/68; 422/101; 73/61 R; 73/432 R

[58] Field of Search ................. 422/68, 101, 261, 263, 422/275; 73/432 R, 61 R, 53; 210/290, 285, 503, 460; 423/658.5; 23/230 M, 230 R

[56] References Cited

U.S. PATENT DOCUMENTS 3,492,396 1/1970 Dalton et al. ........................ 73/61 R 3,620,675 11/1971 Olson ................................ 23/230 R 3,683,678 8/1972 Yau ........................................ 73/53

FOREIGN PATENT DOCUMENTS 1332935 8/1962 France .................................... 422/261

OTHER PUBLICATIONS

F. Langenbucher and H. Rettig, *Drug Development and Industrial Pharmacy,* 3, 241–263, (1977).

J. E. Tingstad and S. Riegelman, J. Pharm. Sci., 59, 692, (1970).

F. Langenbucher, J. Pharm. Sci., 58, 1265, (1969).

J. Blanchard, R. J. Sawchuk et al., Eds., *Drug Bioavailability,* S. Karger, Basel 1979, pp. 27–28.

*Primary Examiner*—S. Leon Bashore

*Assistant Examiner*—Chris Konkol

*Attorney, Agent, or Firm*—Burd, Bartz & Gutenkauf

[57] ABSTRACT

A pore-size graded, packed cascade barrier bed, flow-through cell for the measurement of dissolution behavior. The cell containing a porous packing of insoluble multi-particulate solids is designed to retain, in a flow of solvent, particulate solids such as contained in suspensions and slurries or as a result from the disintegration of tablets, capsules, or the like. The vertical bed is packed in discrete layers with uniform sized, inert particles, progressing from layers of small particles at the bottom to layers of large particles at the top. The solid material to be dissolved, when introduced at the top, is carried down into the bed by gravity and the downward flow of the solvent, separated into particle size fractions by the bed, and held in contact with the flowing solvent. The cell is used in conjunction with suitable means for pumping and controlling solvent flow, for controlling ambient and solvent temperature, and for measuring the concentration of the dissolved solid in the effluent solvent.

14 Claims, 5 Drawing Figures

DRUG DISSOLUTION WITH A CASCADE BARRIER BED

BACKGROUND OF THE INVENTION

1. Field of the Invention

This invention relates to apparatus for the measurement of the dissolution behavior of solid soluble materials in particular solvents. More particularly, the invention relates to a cell for the measurement of the dissolution behavior of drugs.

When dissolution is the rate limiting step in drug absorption, correlations between in vivo drug levels and in vitro dissolution test data are essential if the latter are to serve a useful quality control or dosage form design and development function. Presently known devices for in vitro dissolution testing are poorly designed so as to be fluid-dynamically ill-defined and/or unstable, and/or are not capable of providing unambiguous dissolution information on the heterodisperse multiparticulate solids which are typical of solid drug dosage forms. The invention described herein enables one to subject various sized particles from such dosage forms to well defined solvent flow conditions which are unambiguously related to drug particle size.

2. Description of the Prior Art

Dissolution testing of drugs has been conducted in numerous apparatus variations and types. This equipment represents variations of a relatively few general classes, having well documented design features and primarily falling into two categories: flow-through cells and stirred vessels.

The principal stirred vessel methods are the rotating basket and paddle methods of the USP/NF and the stationary basket—rotating filter method. The former consists of a cylindrical vessel with a rounded bottom having a vertically mounted, rotating screen basket or paddle at the central axis of the vessel. In the latter case, a similar vessel is used, agitation being produced by the vertically mounted and rotating sampling filter at the vessel axis. The dosage unit is placed in a stationary screen basket to one side of the filter. In all three cases, mixing of the dissolution solvent is poor and dissolution of larger particles is favored over smaller. Large particles retained in the baskets are subject to more rapid dissolution. Moreover, small particles tend to lodge between larger particles on the vessel bottom and are shielded from solvent flow. Smaller particles entrained in the solvent, and moving with it, will also experience reduced flow past their surfaces.

Flow-through cells generally provide only gravity restraint of particles in an upward solvent flow, but have filters at both ends preventing particles from leaving the cell. As with the stirred vessel, entrainment of smaller particles in the flow field will diminish their dissolution rate. The largest and smallest particles, immobilized by their weight or by the barrier filter, respectively, will experience essentially the same solvent flow. Alternatively some cells immobilize all particles by sandwiching them tightly between two filters or screens. The USP/NF tablet disintegration apparatus consisting of a vertically oscillating basket arrangement in a solvent bath has been used for dissolution testing. One commercial device subjects the dosage form to a tumbling/kneading action within a bed of uniform sized glass balls, which presumably simulates the action of the GI tract.

Any of the above described devices may be used with simulated gastric or intestinal fluids. Only the sandwich type cell provides a closely defined solvent flow as a function of particle size. The fluid-dynamics of none of the methods favor dissolution of the smaller particles over the larger. Recent studies have correlated data obtained by the three principal stirred vessel methods, indicating that the data obtained provide the same information. Where correlations have not been found, differences in dosage unit disintegration may be responsible.

The Kelvin effect and the large divergence of concentration gradient fields surrounding very small particles tend to favor their rapid dissolution under most conditions. Where the morphology of particles in a polydisperse system is size independent, these may be the only effects. However, various dosage unit formulations may cause differences in the relative intrinsic solubilities and dissolution rates of particles of different sizes. This requires that the fluid-dynamics of dissolution be controlled as a function of particle size. Furthermore, depending upon the resolution desired, at least two procedures, which produce well defined and linearly independent functional relationships between particle size and dissolution fluid-dynamics, are needed. Thus, a single dissolution test procedure cannot be expected to produce data which correlate adequately with the in vivo behavior of different formulations. The present invention provides an essential set of alternate procedures.

SUMMARY OF THE INVENTION

The dissolution measurement apparatus comprises a cell consisting of a vertical tubular housing which is partially filled with a plurality of discrete layers of uniformly sized insoluble and inert particles packed within the housing. The size of the particles in each layer increases successively from the bottom to the top. The bottom of the cell has suitable porous retention means supporting the bottommost particle layer while permitting free flow-through of solvent. A space above the topmost layer provides a solvent receiving chamber. The space below the porous retention means provides a chamber for collecting solvent for discharge through a bottom opening. Desirably a disc having a central opening is disposed on top of the particulate bed. Preferably the particles are in the form of spherical balls. The cell may be utilized manually and intermittently or continuously as part of a system including a solvent reservoir, pumping and metering means, means for analyzing the effluent, etc.

BRIEF DESCRIPTION OF THE DRAWINGS

The invention is illustrated in the accompanying drawings in which.

DETAILED DESCRIPTION OF THE PREFERRED EMBODIMENT

Figure 1:
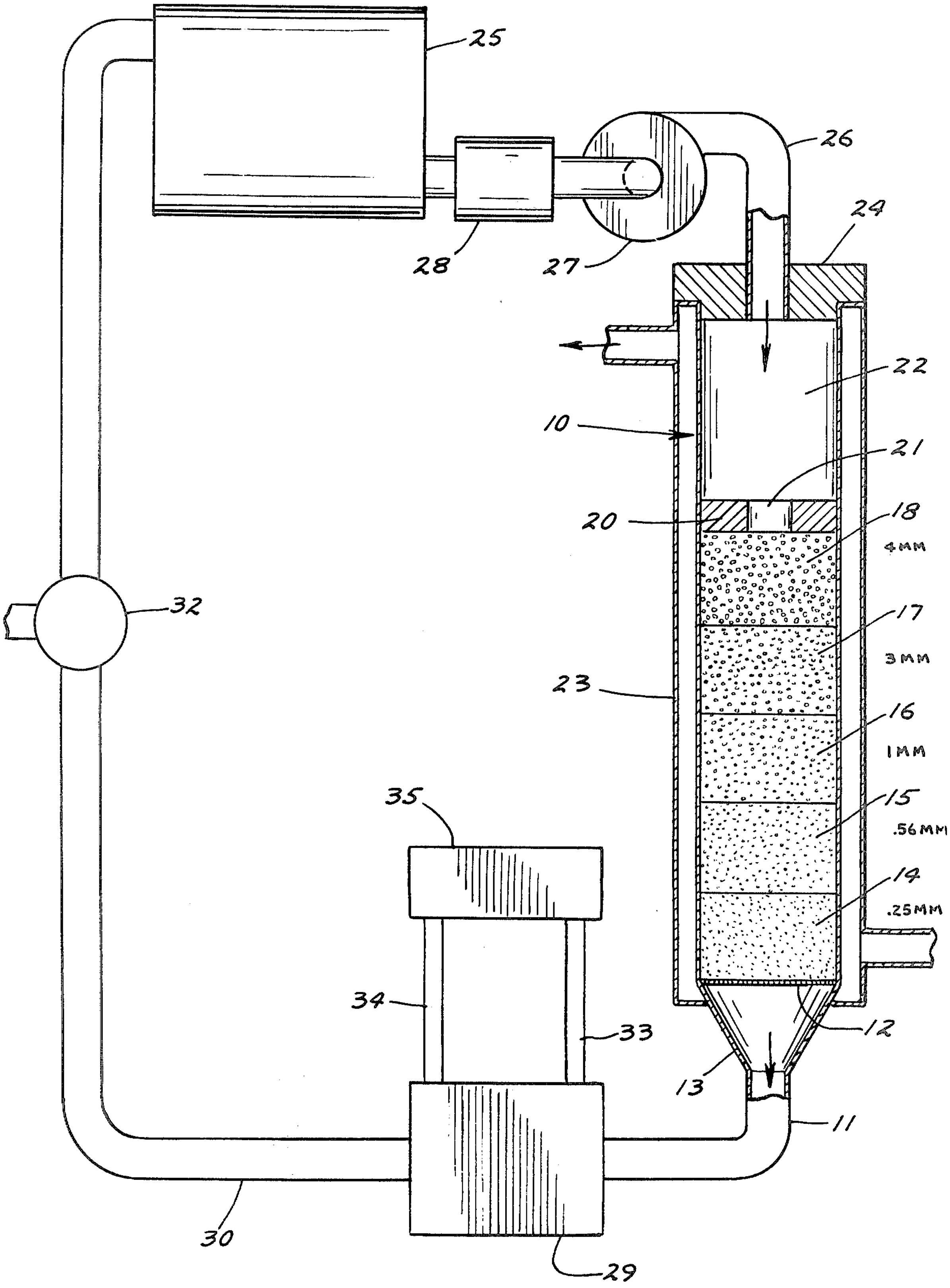
FIG. 1 is an elevation in section of one form of flow-through cascade barrier bed cell shown schematically incorporated into one exemplary form of dissolution measurement system.

Referring now to FIG. 1, cell 10 is shown as a vertical cylindrical tubular housing open at the top and constricted at the bottom to provide a discharge opening 11. Cell 10 is desirably about 2 to 20 cm ID. A porous screen or plate 12 is disposed in the cell housing adjacent the bottom thereof defining a solvent collecting chamber 13 with the bottom cell wall. A plurality of discrete layers 14–18 of uniformly sized insoluble and inert particles are stacked within the cell housing supported by plate 12. The size of the particles in each layer increases successively from the bottom to the top of the bed with the smallest particles in layer 14, next largest particles in layer 15, and so on to the largest particles in layer 18. The layers are preferably about 1 to 10 cm deep and at least two in number. The particles desirably range in size from about 0.05 to 5 mm diameter. Preferably a relatively thick disc 20 perforated by a central axial hole 21 rests on top of the bed of particles. The space above disc 20 defines a solvent receiving chamber 22. Preferably a water jacket 23, a heating coil or similar temperature control means, is provided surrounding the cell.

The tubular cell housing containing the packed bed need not have the preferred cylindrical shape with no taper and circular cross section. Instead, the tube may be tapered and reduced in cross sectional area gradually or in steps progressing toward the bottom to provide higher relative solvent velocities in the more constricted sections of the tube.

The particles making up layers 14–18 are preferably spherical balls of uniform diameter in each layer. Alternatively, the bed packings may consist of particles having other shapes such as rods, cubes, spirals, discs, and the like. All of the layers should be composed of particles of the same geometric configuration differing only in size or scale from layer to layer. The number of layers and the thickness or depth of each layer may be varied and the size of the particles used in the layers may be varied. These three parameters are chosen to complement the particle size distribution of the particular material being tested. Thus, the layers should have the proper capacity and the proper pore sizes to trap the dissolving solids and hold them in contact with flowing solvent.

Cell housing 10, perforated disc 20, and the particles making up the bed layers are preferably made of borosilicate glass which has been silanized. However, alternate materials may be used including Teflon, Lucite, stainless steel, and the like, the material in each case being inert, insoluble in the solvent used, and impervious to the particular drug species being tested. The porous plug or screen 12 at the cylinder bottom preferably is removable for cleaning and is best made of sintered glass or gold plated stainless steel screen.

The cascade barrier bed cell as described may be utilized by placing the material to be tested within the opening in disc 20, pouring a measured amount of solvent into the top of the cell, collecting the effluent from the cell, and subjecting it to analysis. Alternatively, the cell may be part of an overall dissolution behavior system, one exemplary form of which is illustrated.

The top of the cell is provided with a closure 24. A reservoir 25 is provided to contain dissolution solvent. Reservoir 25 is connected to the top of the cell by means of a tubular passageway 26. The liquid may be propelled by means of a pump 27. The liquid flow rate may be measured by means of a suitable flow meter 28 situated in tube 26. The solvent after contacting the material to be dissolved may pass from chamber 13 through a concentration detecting means 29 and then pass through tube 30 for recycling to reservoir 25 or discharge through a three-way valve 32. The detecting means may be, for example, an ultra-violet absorbent spectrophotometer, ultraviolet-visible polarimeter, infra-red absorption spectrophotometer, voltametric detectors, conductometric detectors, or the like. The detecting means 29 may be connected through leads 33 and 34 to a recording device 35 which records the concentration of the solute in the solvent as measured by the concentration detector.

Figure 5:
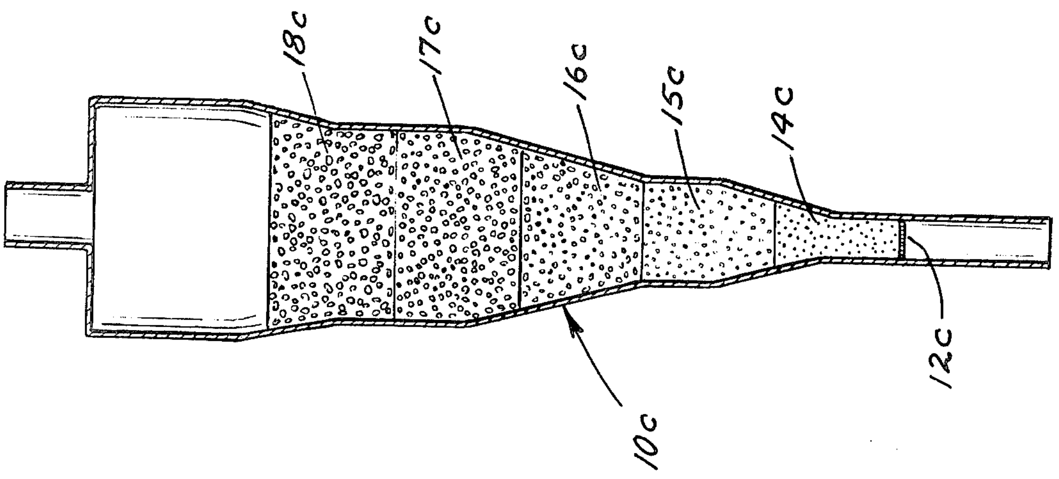
FIGS. 3, 4 and 5 are elevations in section of alternative forms of cascade barrier bed cells.
Figure 4:
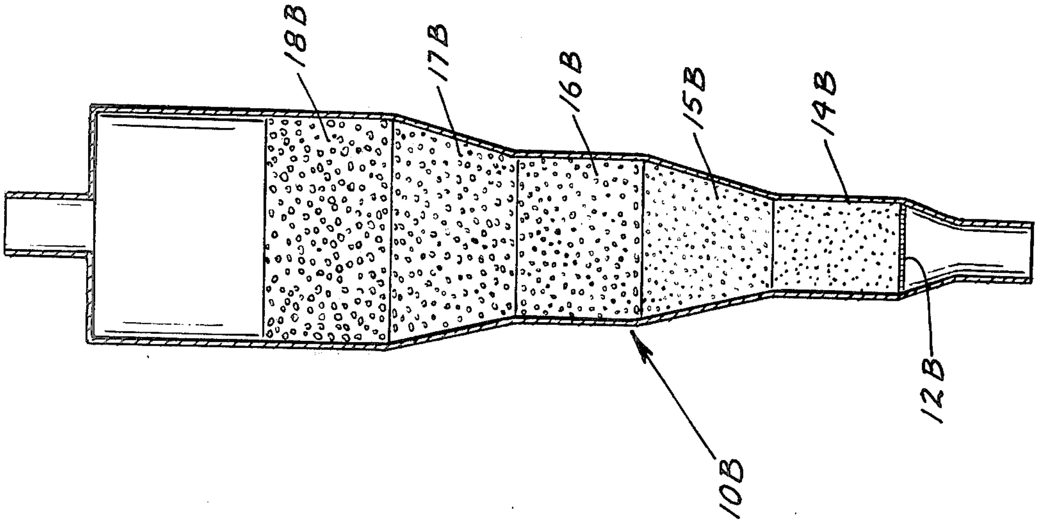
Figure 3:
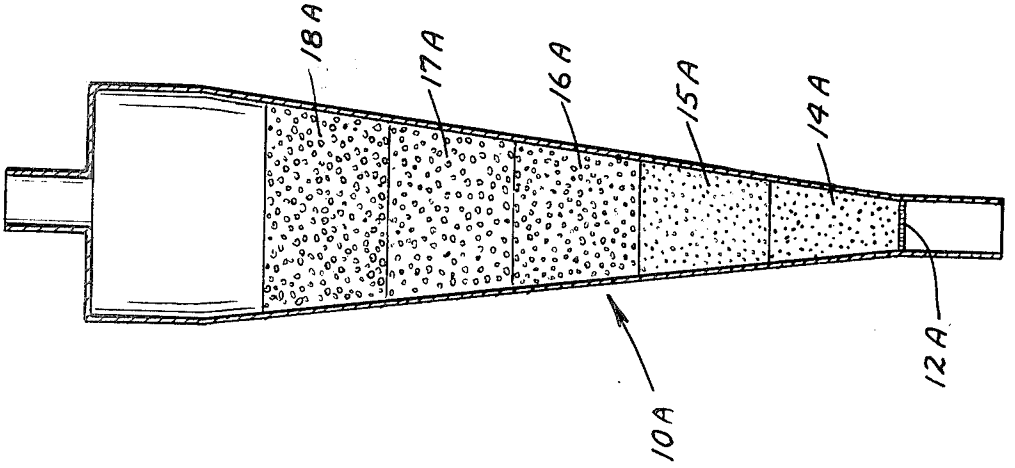

FIGS. 3, 4 and 5 show alternatives to the cylindrical form of cascade barrier bed cell. Cell 10A (FIG. 3) is generally in the form of an inverted cone of constantly increasing cross sectional diameter from bottom to top. Each bed 14A to 18A is of generally truncated conical form. Cell 10B (FIG. 4) is made up of alternating cylindrical and truncated conical segments of increasing diameter from bottom to top. The beds 14B to 18B are so disposed within the cell that each bed fully occupies one of the cell housing segments. Thus, beds 14B, 16B and 18B are generally cylindrical in form while beds 15B and 17B are generally in the form of inverted truncated cones. Cell 10C (FIG. 5) is likewise composed of alternating cylindrical and truncated conical sections. However, the beds 14C and 18C are disposed so that each occupies part of a cylindrical and part of a conical segment of the cell housing. Thus, the lower portions of bed layers 14C, 16C and 18C are generally cylindrical in configuration while the upper portions of these layers are generally conical in form. Layers 15C and 17C are the opposite with the lower portions of each being generally conical and the upper portions generally cylindrical.

The material to be tested, a powder, slurry, disintegrating dosage unit such as a tablet or capsule, or the like, is placed within hole 21 in disc 20 on top of the particle bed. A flow of solvent is introduced to the top of the cell at a controlled and measured rate, as by a pump and metering device or other suitable means. The solvent passes through the disc 20, the particle beds and porous plate 12, and out through the bottom of the cell. The washer-like perforated disc 20 reduces the effective cross sectional area of the cell at the top end of the cell housing, providing a higher relative solvent velocity. This facilitates the transport of particles of the material being tested into the bed by viscous drag forces and gravity to a level where they lodge and are trapped and exposed to solvent flow. The larger solid particles are lodged in the larger pores of the coarser upper bed layers while the finer material passes through and is lodged in the smaller pores of the finer beds. Their location is determined by drug particle size and the pore size characteristic of each layer in the bed. Particles from polydisperse systems are thus separated into various size fractions within the bed.

The temperature of the bed and flowing solvent should be controlled. The temperature may be maintained at any reasonable level where the materials are chemically stable. However, the preferred range is from about 15° C. to 45° C. The temperature of the cell housing is maintained by means of water jacket 23 or equivalent means. The solvent should be brought to the temperature of the bed by passage through heated tubes or a heating coil in reservoir 25, or the like.

Solvent flow rates may be constant or varied with time, with a constant rate being preferred. Solvent flux may range up to 300 ml/cm$^2$/min and above. However, the preferred range is 3 to 30 ml/cm$^2$/min in terms of bed cross sectional area. Solvents may be either aqueous or non-aqueous and may consist of simulated gastric and intestinal fluids. These latter two solvents and dilute aqueous bases and acids such as 0.10 N HCl are generally preferred.

Although fluid flow fields in this type of packed cascade barrier bed are complicated, the fluid-dynamics within the various layers are simply related. With column and ball diameters in a practical range for dissolution testing, random packing fractions of uniform spheres are size independent. For constant column cross sectional area, the average linear velocity of the solvent will also be constant throughout the bed for incompressible fluids. Voids and pores are geometrically similar among the various bed layers and have dimensions in direct proportion to ball size. Therefore, solvent laminar flow shear rates are inversely proportional to ball size at equivalent locations within the voids and pores of various layers. Under these conditions, shear rate gradients are inversely proportional to the square of ball dimension. The overall effect can be enhanced using tapered columns having reduced cross sectional areas in conjunction with the smaller balls. Uniform random packings of other than spheres are also feasible. No loss of solubility rate dependency on particle size will occur in going from sink to non-sink conditions provided significant saturation does not occur in a single pass of solvent through the cell.

Established methods permit dissolution tests to be conducted under diverse experimental conditions, e.g., turbulent or laminar flow, programmed solvent changes, and sink or non-sink modes. Many procedures will accommodate disintegrating dosage forms. Methodological flexibility notwithstanding, present procedures do not permit an unambiguous resolution of dissolution pattern differences among various size particles in polydisperse systems. This requires that the fluid-dynamics of dissolution be controlled as a function of particle size. Furthermore, depending upon the resolution desired, at least two procedures, which produce well defined and linearly independent functional relationships between particle size and dissolution fluid-dynamics, are needed.

A fluid in laminar flow through a randomly packed bed of monodisperse inert and insoluble particles will have a complicated but streamlined flow pattern. Similar beds differing only in particle size will have similar fluid flow patterns differing only in scale. Solids packing fractions of such beds are equal, except for wall effects. A sequence of such beds in series within a column of constant cross section will experience a uniform flux when an incompressible fluid is passed through. Thus, in such a system, the fluid shear rate at corresponding locations, "reduced radii", in voids or pores is inversely proportional to the size of the packing material. Further, the shear rate gradients in correspondingly similar pores and voids of different beds are inversely proportional to the square of the size of the packing material. (These relationships hold to a lesser extent in the case of turbulent flow, and, therefore, laminar flow conditions are preferred.) Particles trapped in the voids and pores of such beds are thus subjected to well defined but different dissolution conditions on the basis of their particle size.

EXAMPLE

The invention is further illustrated by the following:

The dissolution cell consisted of a Pyrex 1.9 cm ID cylindrical tube, 50 cm long, fitted with a 100 mesh stainless steel screen at the bottom. The column was packed with five layers, each 6.25 cm in depth, comprised of silanized glass balls having diameters of: 0.25, 0.56, 1, 2 and 4 mm. This cell was tested using deaerated 0.01 N $H_2SO_4$ at a flow rate of 30 ml/min under sink conditions. For comparison, the USP rotating basket method was run at 120 rev/min using the same solvent, essentially under sink conditions due to low saturation levels. Sulfadiazine USP powder was compressed into tablets, coarsely ground in a mortar, and screened through US Standard sieves. Two size fractions were used as test materials: those passing a 30 mesh and retained on a 50 mesh sieve, and those passing a 100 mesh and retained on a 200 mesh sieve. The non-disintegrating powders were placed either on top of the bed or in the basket, depending on the apparatus, at the start of each run. All experiments were conducted at 25±0.1 degrees, and samples withdrawn at 3 to 5 minute intervals were assayed by UV absorption at 243 nm. Cumulative fraction dissolved, f, was fitted to the equation $f=bt-ct^2$ by the method of least squares. Results are shown in Table I.

The ratio of the initial dissolution rate of the small particles to that of the large particles can be taken as the ratio of the corresponding b values. This ratio is 7.7 and 4.4 for the cascade barrier bed (CBB) and USP methods, respectively. Assuming a uniform size distribution for each powder fraction, the finer powder should have approximately four times the specific surface area of the coarse powder. Thus, the initial dissolution rate per unit surface area of the fine powder is nearly twice that of the coarse powder for the CBB method and is comparable to the coarse powder for the USP method. These observations conform to expectations based on apparatus design.

Figure 2:
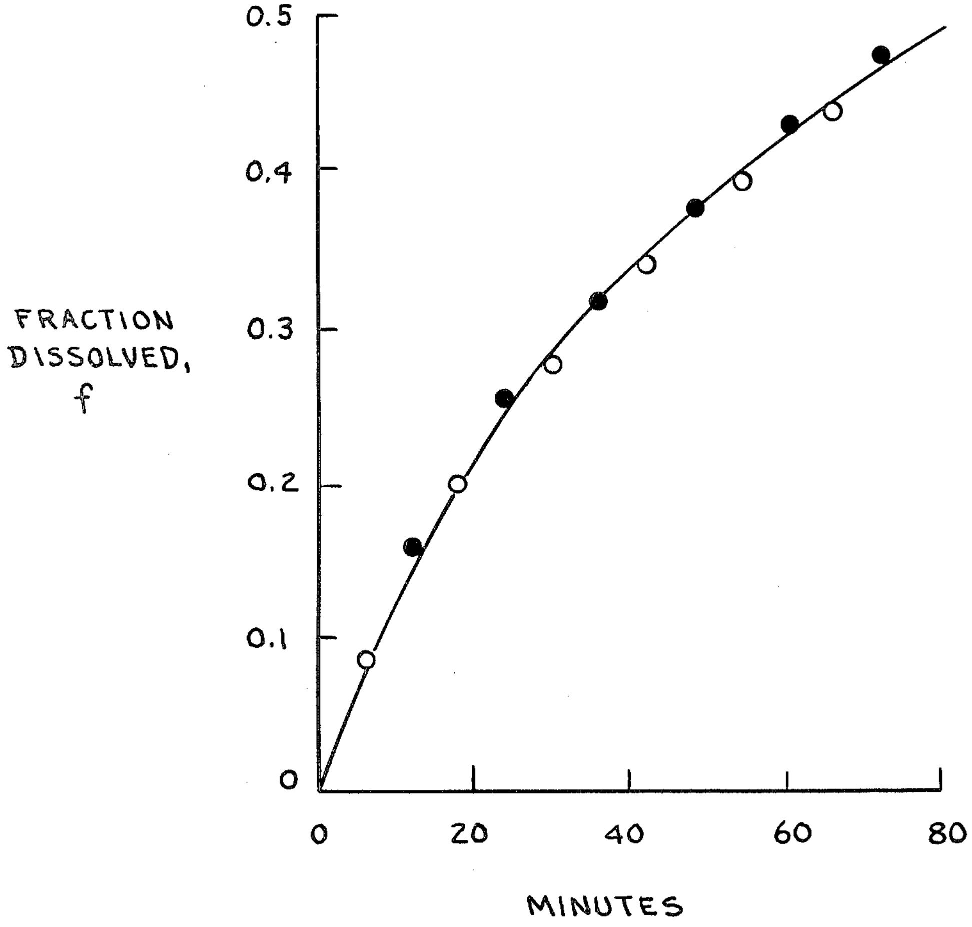
FIG. 2 shows sulfadiazine dissolution data derived from use of the cascade barrier bed cell.

FIG. 2 shows the CBB dissolution behavior of a mixture of 5 mg each of the fine and coarse sulfadiazine powders. For comparison, results of separate CBB runs of 5 mg of the individual powder grades have been added and the sum plotted. The two plots closely correspond and indicate independent dissolution behavior of the two powder fractions within the bed. These findings do not indicate the superiority of one in vitro dissolution apparatus over another. Instead, they suggest that, where particle size effects prevent useful correlations with in vivo drug levels, parallel use of two such contrasting methods is necessary. However, the cell of this invention provides for control of in vitro dissolution test conditions for multi-particulate solids which has not been possible using prior known methods.

TABLE I

Regression Coefficients for Sulfadiazine Dissolution by Cascade Barrier Bed (CBB) and USP Basket Methods

| Method | Sulfadiazine mg | Particle Size, mesh | Linear Coefficient, $b \times 10^3$, $min^{-1}$ | Quadric Coefficient, $C \times 10^5$, $Min^{-}$ |
|---|---|---|---|---|
| CBB | 10 | 100/200[a] | 21.0 | 31.4 |
| | 10 | 30/50[a] | 2.7 | 1.6 |
| | 5,5 | 100/200[b], 30/50 | 14.5 | 19.7 |
| USP | 10 | 100/200[a] | 11.1 | 9.1 |
| | 10 | 30/50[a] | 2.5 | 2.6 |
| | 5,5 | 100/200[b], 30/50 | 7.1 | 5.4 |

[a] Average of duplicate runs.
[b] Average of triplicate runs.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A solids dissolution measurement cell comprising:

(A) a vertical tubular cell housing, (B) porous retention means adjacent to the bottom end of said housing, (C) a cascade barrier bed composed of a plurality of discrete layers of uniformly sized insoluble and inert particles packed within said housing supported on said retention means, the size of particles in each layer increasing successively from bottom to top, (D) a non-pervious barrier wall disposed within the housing atop the uppermost particle layer, said barrier wall having a central solids-receiving aperture therein, (E) a solvent receiving chamber at the top of the housing above said barrier wall, and (F) a solvent discharge opening at the bottom of the housing.

2. A cell according to claim 1 wherein said layers of inert particles are at least two in number.

3. A cell according to claim 1 wherein said inert particles range in size from about 0.05 to 5 mm.

4. A cell according to claim 1 wherein the cell housing is between about 2 to 20 cm inside diameter and said layers are of substantially uniform depth and from about 1 to 10 cm deep.

5. A cell according to claim 1 wherein said cell housing is enclosed with a temperature control means.

6. A solids dissolution measurement apparatus comprising:

(A) a cascade barrier bed cell according to claim 1, (B) a solvent reservoir, (C) means for conducting solvent at a controlled and measured rate from said reservoir to the top of said cell, (D) concentration detecting means, and (E) means for conducting solvent containing dissolved solids from the bottom of said cell to said concentration detecting means.

7. A method for the measurement of the dissolution behavior of solid soluble materials in particular solvents, which method comprises:

(A) introducing a solid soluble material on the top surface of a cascade barrier bed composed of a plurality of discrete layers of uniformly sized insoluble and inert particles whose size increases successively in each layer from bottom to top, (B) introducing a solvent for said solid material above the bed for partial dissolution of the material and distribution through the bed, with material particles of larger size being distributed in the voids among the larger bed particles and material particles of smaller size being distributed in the voids among the smaller bed particles, (C) continuing introduction of solvent above the bed for flow through the bed at shear rates relative to the material particles inversely proportional to bed particle size at equivalent locations within the voids of various bed layers, (D) collecting the solvent effluent passed through the bed, and (E) analyzing said effluent.

8. The method according to claim 7 wherein said solvent is introduced to the top of the topmost bed layer at a higher relative velocity by restricting the effective cross-sectional solvent flow area.

9. The method of claim 8 wherein the solid soluble material is introduced to the top of the topmost bed layer at the point of higher relative solvent velocity.

10. The method of claim 7 wherein the solvent effluent is analyzed by determining its concentration.

11. The method of claim 7 wherein the solvent effluent is recycled for successive passes through the bed.

12. The method of claim 7 wherein the bed is maintained at a temperature between about 15° C. to 45° C.

13. The method of claim 7 wherein said bed layers are at least two in number and said inert bed particles range in size from about 0.05 to 5 mm.

14. The method of claim 7 wherein the solvent flux is between about 3 to 300 ml/cm$^2$/min in terms of bed cross-sectional area.

* * * * *

UNITED STATES PATENT AND TRADEMARK OFFICE
CERTIFICATE OF CORRECTION

PATENT NO. : 4,247,298

DATED : Januaary 27, 1981

INVENTOR(S) : Edward G. Rippie

It is certified that error appears in the above-identified patent and that said Letters Patent are hereby corrected as shown below:

Column 6, line 58, "$Min^{-}$ " should be --$min^{-2}$ --.

Signed and Sealed this

***Fourteenth* Day of *April 1981***

[SEAL]

*Attest:*

RENE D. TEGTMEYER

*Attesting Officer* *Acting Commissioner of Patents and Trademarks*